United States Patent
Gill

(12) 
(10) Patent No.: US 6,432,308 B1
(45) Date of Patent: Aug. 13, 2002

(54) FILTER ELEMENT WITH POROUS NICKEL-BASED ALLOY SUBSTRATE AND METAL OXIDE MEMBRANE

(75) Inventor: James A. Gill, Kennett Square, PA (US)

(73) Assignee: Graver Technologies, Inc., Glasgow, DE (US)

(*) Notice: Subject to any disclaimer, the term of this patent is extended or adjusted under 35 U.S.C. 154(b) by 0 days.

(21) Appl. No.: 09/669,414

(22) Filed: Sep. 25, 2000

(51) Int. Cl.[7] .............................................. B01D 71/02
(52) U.S. Cl. ............... 210/500.25; 210/490; 210/510.1; 55/523; 55/524
(58) Field of Search ........................... 210/500.25, 490, 210/483, 489, 510.1; 427/244, 126.3; 55/523, 524

(56) References Cited

U.S. PATENT DOCUMENTS

| 4,088,576 A | | 5/1978 | Mott |
|---|---|---|---|
| 4,356,215 A | | 10/1982 | Auriol et al. |
| 4,412,921 A | | 11/1983 | Leung et al. |
| 4,888,114 A | | 12/1989 | Gaddis et al. |
| 5,114,447 A | * | 5/1992 | Davis |
| 5,139,747 A | * | 8/1992 | Cato et al. |
| 5,264,012 A | * | 11/1993 | Clough et al. |
| 5,364,586 A | * | 11/1994 | Trusov et al. |
| 5,415,775 A | * | 5/1995 | Castillon et al. |
| 5,885,657 A | * | 3/1999 | Penth |
| 6,152,978 A | * | 11/2000 | Lundquist |

OTHER PUBLICATIONS

W. Blake Kolb et al, "The Ins and Outsa of Coating Monolithic Structures", chemical engineering Progress, Feb. 1993, pp. 61–67.*

Haynes International, Inc., "Hastelloy C–22 Alloy Excels in Pitting Resistance", 1997, pp. 2–24.

* cited by examiner

Primary Examiner—Ana Fortuna
(74) Attorney, Agent, or Firm—Piper Rudnick; Jefferson Perkins

(57) ABSTRACT

Powdered nickel-based alloys having substantial amounts of chromium and molybdenum are molded and sintered to form tubular filter supports. Metal oxide particulates, preferably titanium oxide, are impregnated into the interior surfaces of the tubular elements and sintered to create 0.1 micron filter membranes. Hastelloy C-22 is a preferred nickel-based alloy for forming the porous metal support, while rutile is preferred as a starting material for forming the filter membrane. The resultant porous metal/metal oxide filter elements have superior resistance to chemical attack in high chloride, low pH environments.

6 Claims, 2 Drawing Sheets

FILTER ELEMENT WITH POROUS NICKEL-BASED ALLOY SUBSTRATE AND METAL OXIDE MEMBRANE

TECHNICAL FIELD OF THE INVENTION

The present invention relates in general to filter elements, and more particularly to filter elements made from porous sintered powdered metal substrates which have been impregnated with a finely divided metal oxide as filter membranes.

BACKGROUND OF THE INVENTION

Conventional filter elements are known which have porous metal substrates and membranes or coatings thereon of a finely divided metal oxide, such as a titanium oxide or zirconium oxide. The state of the art is exemplified by the tubular filter elements disclosed in U.S. Pat. No. 4,888,114 issued to Gaddis et al., which is owned by the assignee of this invention. Gaddis et al. disclose the provision of a 316 L stainless steel particulate tubular substrate on which is impregnated a titanium oxide. Gaddis et al. make their tubular support members out of particles of 316 L stainless steel that are approximately 30 microns in size. A slurry of titanium dioxide is forced into an inside wall of the tubular substrate and sintered at 1093° C. in a reducing atmosphere such as hydrogen.

A drawback of stainless steel-based tubular filter elements is that they are attacked by acidic, chloride-based environments. A need therefore exists for filter elements with porous metal substrates which can better survive halogenic acid attack, and which can be used more effectively in converted corn syrup and other high-chloride, low-pH environments.

SUMMARY OF THE INVENTION

The present invention provides a filter element which uses a porous metal substrate, the metal of the substrate consisting of a nickel-based alloy having at least fifty-six percent nickel, at least sixteen percent chromium and at least five percent molybdenum by weight. A sintered metal oxide powder is supported by this substrate.

Preferably, the nickel-based alloy used as the support further includes at least three percent by weight of tungsten. More preferably the alloy forming the substrate comprises at least twenty percent chromium and at least thirteen percent molybdenum by weight.

A method of fabricating tubular elements according to the invention selects a nickel-based alloy, containing substantial amounts of chromium and molybdenum, in a powder form with a particle size that is no larger than 150 microns and more preferably no larger than 44 microns. A tubular mold is filled with the powdered alloy and is subjected to an isostatic pressure of at least 37,000 pounds per square inch to form an unfired workpiece. The workpiece is fired and subsequently impregnated with a powdered metal oxide, such as zirconium or more preferably titanium oxide. The impregnated workpiece is again fired under a reducing atmosphere at a temperature substantially below the temperature attained in the first firing step. A sintered, metal oxide coated tubular filtration element according to the invention results.

Preferably, titanium oxide forms the filtration membrane. In a preferred embodiment in which a rutile form of titanium dioxide ($TiO_2$) is used as a starting material, and responsive to the step of firing the workpiece under a reducing atmosphere, the applied rutile form is converted to one or more reduced titanium oxides of the formula $Ti_xO_y$, where y is less than 2x. The titanium oxides forming the membrane consist mostly of $Ti_4O_7$ with some $Ti_2O_3$ and $Ti_6O_{11}$.

Tubular filtration elements manufactured according to the invention exhibit substantially superior resistance to attack by high-chloride, acidic solutions and outperform their stainless steel counterparts.

BRIEF DESCRIPTION OF THE DRAWINGS

The following description should be read in light of the drawings, in which.

DETAILED DESCRIPTION

Figure 1:
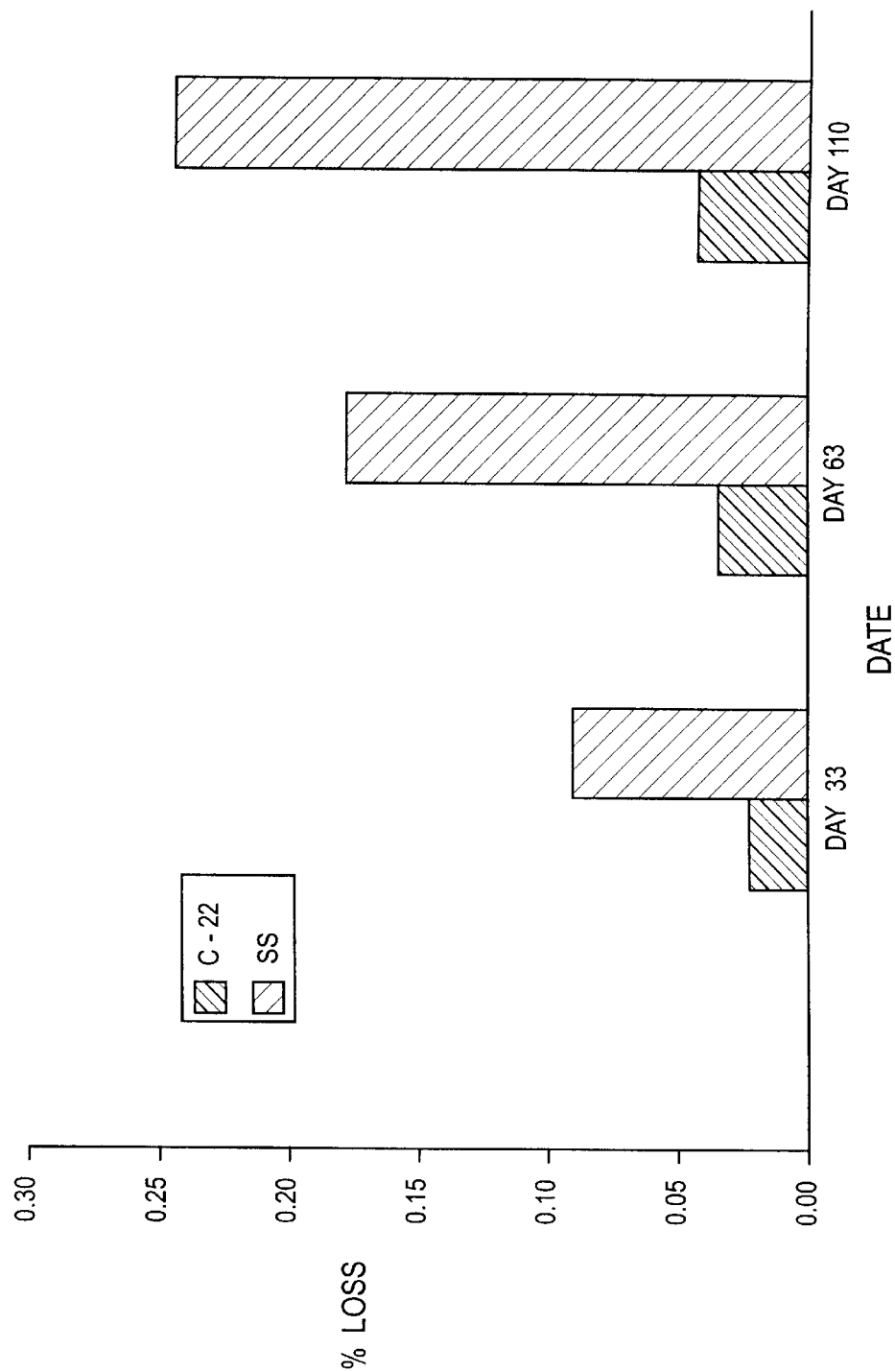
FIG. 1 is a graph showing percentage weight loss of tubular filter element substrates made according to the invention and made from stainless steel according to the prior art, when samples were subjected to a low pH, high chloride-containing bath.

According to the invention, filtration elements are provided which have a porous metal substrate, onto a surface of which has been impregnated a membrane of metal oxide. The porous metal substrate is formed from a nickel-based alloy having substantial amounts of chromium and molybdenum. Preferably, the nickel alloy used has at least twenty percent chromium and at least thirteen percent molybdenum, and further consists of a smaller portion of tungsten, such as three percent by weight. A particularly preferred composition is Hastelloy® C-22, a commercially available nickel-based alloy composed of 56 to 57.35 percent nickel (all percentages given herein are by weight); from 20 to 22 percent chromium; about 13 to 13.52 percent molybdenum; 3 to 3.34 percent tungsten; and between 3 and 4.7 percent iron. Hastelloy® C-22 further has 2 to 2½ percent cobalt by weight, 0.08 to 0.52 percent silicon, 0.27 to 0.50 manganese, 0.015 to 0.9 carbon, and up to 0.35 percent vanadium.

While Hastelloy C-22 is particularly preferred, other commercially available nickel/chromium/molybdenum alloys can be used, such as Hastelloy® C-4, Hastelloy® C-276 and Haynes® 625, all available (along with Hastelloy C-22) from Haynes International, Inc. Representative compositions of these nickel-based alloys are presented in Table 1.

TABLE 1

Compositions of Nickel-Based Substrates, % WT.

| Element | Hastelloy ® C-22 | Hastelloy ® C-4 | Hastelloy ® C-276 | Haynes ® 625 |
|---------|------------------|-----------------|-------------------|--------------|
| Ni | 56–57.3 | 65 | 57 | 62 |
| Cr | 20–22 | 16 | 16 | 22 |
| Mo | 13–13.5 | 16 | 5 | 9 |
| W | 3–3.3 | — | 4 | — |
| Fe | 3–4.7 | 3 | 5 | — |
| Co | 0.1–2.5 | 2 | 2.5 | — |
| Si | 0.08–0.52 | 0.08 | 0.08 | 0.05 |
| C | 0.015–0.9 | 0.01 | 0.01 | — |
| Ti | — | 0.7 | — | — |
| Mn | 0.27–0.50 | 1 | 0.50 | — |
| Al | — | — | — | 0.2 |
| Nb | — | — | — | 3.9 |
| V | <0.01 | — | 0.35 | — |
| S | 0.006 | — | — | — |

While, as will be described below, Hastelloy C-22 demonstrates greatly improved corrosion resistance in comparison to a stainless steel 316 L substrate, comparative corrosion tests of the other three above-listed nickel-based alloys suggest that they will resist high-chloride, acidic attack better than stainless steel as well.

The selected nickel-based alloy is provided in a powdered form. The metal particles should have a particle size no greater than 150 microns, with 325-mesh powder being preferred, which has particle sizes no larger than 44 microns in diameter.

Metal oxide particles are impregnated on a support made from the nickel-based powder alloy to form a filter membrane thereon. Zirconium and titanium oxides may be used to form the filter membrane according to the invention, with titanium dioxide ($TiO_2$) in rutile form being particularly preferred as a starting material.

The metal oxide particles used in the present invention have a particle size of from 0.2 to 1.0 micron. The metal oxide should be sinterable at a temperature below the melting point of the metal used to form the support. One source of powder titanium oxide is DuPont's Ti-Pure R101.

It has been found that, in order to form tubular shapes of powdered, nickel-based alloy, an elevated mold pressure is required in order for the workpieces to retain sufficient structural integrity for sintering. According to the invention, tubular molds and an isostatic press are used which apply an isostatic pressure of at least 37,000 psi, and as high as 100,000 psi.

After being molded, the unfired, metal substrate workpieces are fired under a reducing atmosphere, such as hydrogen, with a firing temperature sufficient to partially fuse the metal particles. For Hastelloy C-22, this temperature is approximately 1330° C. or 2425° F. Fired tube sections are preferably TIG welded together to desired filter lengths, with an appropriate C-22 alloy or equivalent nickel-based metal wire. The welding process preferably incorporates standard TIG welding practices for porous metal tubing with the exclusive use of argon as the shielding gas.

After the nickel-based substrate tubes have been cooled and welded into desired lengths, the internal surfaces thereof are coated with the selected powdered metal oxide. This is conveniently done by forming a slurry of the metal oxide and impregnating the interior tube wall with the slurry either through mechanical pressure, as by drawing a tightly fitting stopper through the tube, or by pumping the slurry into the tube under a predetermined fluid head pressure. In the fluid pressurized method, it is preferred to have a head pressure of about 8 inches of water with the pumping step taking approximately six seconds. It is further preferred that a second slurry coating step be used following the first.

Either application step will impregnate a certain thickness of the metallic support with metal oxide particles, such as 50 microns as measured from the interior surface of the substrate. After a thorough drying, the coated filter elements are fired at a temperature substantially less than that of the firing temperature of the metal support, with a preferred firing temperature being approximately 2000° F. or 1093° C.

Example I

Tests were performed in order to evaluate the corrosion and resistance of various nickel-based alloys in a chloride-rich, acidic environment. The listed nickel-based alloys and, as comparison, type 316 stainless steel, were each subjected to a solution of 4% NaCl, 0.1% $Fe_2(SO_4)_3$ and 0.01 M HCl. This solution contains 24,300 ppm of chlorides and has a pH of 2. In both pitting and crevice-corrosion testing, the solution temperature was varied in 5 degree Celsius increments to determine the lowest temperature at which pitting corrosion initiated, as observed by examination at a magnification of 40 power, after a twenty-four hour exposure period. This was termed the critical pitting temperature. A critical crevice-corrosion temperature was deduced as the lowest temperature at which crevice corrosion was initiated in a 100-hour exposure period.

| Alloy | Critical Pitting Temperature | | Critical Crevice-Corrosion Temperature | |
|---|---|---|---|---|
| | ° C. | ° F. | ° C. | ° F. |
| HASTELLOY ® C-22 ® alloy | >150 | >302 | 102 | 216 (boiling) |
| HASTELLOY ® C-276 alloy | 150 | 302 | 80 | 176 |
| HASTELLOY ® C-4 alloy | 140 | 284 | 50 | 122 |
| HAYNES ®625 alloy | 90 | 194 | 50 | 122 |
| Type 316 Stainless Steel | 20 | 68 | <-5 | <23 |

The above data demonstrate the superiority of the listed nickel-based alloys in high chloride, acidic environments as compared with stainless steel.

Example II

Tubular substrates were prepared for comparative testing as follows.

A series of Hastelloy C-22 tubes were prepared by taking a powdered form of Hastelloy C-22, at 325- mesh, and pouring it into an isostatic mold for a tube configuration. The tube mold is prepared by spraying a mandrel of the tube with a Teflon® release agent. The tube has a ¾ inch internal diameter and a 57/64 inch outside diameter and is 28.5 inches long. Approximately 435 grams of the powder are used to fill the tube. The mold is sealed and placed in an isostatic press. The mold is pressed at a pressure of between 37,000–60,000 psi for one minute and then removed. The tube is removed from the mandrel and the shell of the mold. The tube is placed on a ceramic tray and fired in a reducing (hydrogen) atmosphere furnace with a firing temperature of approximately 2425° Fahrenheit at an index push of twelve inches per twelve minutes. The hot zone of the furnace is approximately 70 inches long. The cooling zone/rate is in accordance with practices that maintain the Hastelloy C-22 metal properties. The fired tubes are removed from the furnace, straightened and trimmed to a two foot length. The two-foot tubes are TIG welded together to desired lengths, as much as ten feet, with an appropriate C-22 alloy or equivalent nickel-based metal wire.

The welded tubes are internally coated with a $TiO_2$ (rutile) coating. The coating is made using 1200 grams of DuPont's TI-Pure® 101 with 3800 milliliters of tap water and approximately 3 grams Nopcosperse-44® dispersant. This is milled in an attritor mill for 5 to 15 minutes at 200 RPM. The resultant slurry is pumped through the porous metal tube substrates with a head pressure of about 8 inches water for approximately 6 seconds. Each tube is drained for 5 to 15 seconds then the entire length of the tube is swabbed using a wetted sponge affixed on a rod of a sufficient length to push the excess through the tube. Once this step is completed, the tubes are dried a minimum of 8 hours at room temperature. A second slurry step is started by preparing a second slurry mixture in a manner similar to the preparation of the first slurry mixture. The second slurry mixture has 800 grams of DuPont TI-Pure® 101, 3800 grams of water and about 3 grams of Nopsosperse-44® dispersant. The second slurry is pumped through the tube for approximately 5 to 15 seconds. The pumping of the slurry is then stopped and the tube is stood on end for a minimum of 30 minutes before being set horizontal for finished drying. The second coated tubes are dried at room temperature for a minimum of 24 hours.

Next, the twice coated and dried tubes are fired in a reducing atmosphere furnace (hydrogen) at 2000° Fahrenheit (1093° C.). The index push rate is 24 inches every 5 minutes. The furnace hot zone is approximately 70 inches long. The cooling rate is established in accordance with practices that keep the properties of the underlying nickel-based metal substrate intact. During sintering of the ceramic coating onto the metal substrate, it has been determined that the $TiO_2$ is reduced to a predominately $Ti_4O_7$ form, with two less prevalent titanium oxide forms being $Ti_6O_{11}$ and $Ti_2O_3$. This firing step produces an approximate 0.1 micron-porous membrane on the internal surface of the tubes. The depth of the coating is determined to be approximately 50 microns deep.

Example III

Twenty-four samples of C-22 nickel-based alloy powdered nickel-based alloy metal tubes, and twenty-six samples of 316 L stainless steel powdered metal tubes were pressed and sintered according to the above methodology and then cut to approximately 4 inches in length. The tubes were cleaned and weighed for a reference start weight. A solution of HCl, NaCl, and 18 megaohm pure water was mixed to a 3.1 pH level and a 10,000 ppm chloride level. Eight to nine samples were placed into each of several 800 ml beakers. The two tube material types were kept in separate beakers. The solution was poured into each of the beakers to adequately cover the metal samples. A loose lid was placed on each beaker and the beakers were placed in a covered, heated waterbath. Usually, the temperature of the bath was maintained at 195° Fahrenheit, plus or minus 40° Fahrenheit. The liquor was changed out every other day for five days, and on those days the samples were cleaned using a 2% caustic solution and de-ionized water, agitating the mixture around the samples in an ultrasonic bath for 15 minutes. The samples were, on those occasions, rinsed for a minimum of 30 minutes in de-ionized water. The acid solution was then replaced and the beakers were returned to the 195° Fahrenheit bath. A liquor sample was taken each week and at any other time that the sample had shown atypical behavior. The liquor samples were analyzed for chromium, nickel, magnesium, silicon, iron, calcium and potassium.

At the end of approximately 30, 60, and 90 day periods, the samples were cleaned using a 2% caustic solution and a nitric acid wash. The nitric acid wash was made by taking the de-ionized water and adding nitric acid to the water until a pH of less than 2 was obtained. The samples were immersed in the nitric acid wash for 15 minutes in an ultrasonic cleaner. The samples were then rinsed in running de-ionized water for a minimum of 15 minutes. The samples were then dried overnight before being weighed and recorded.

Figure 2:
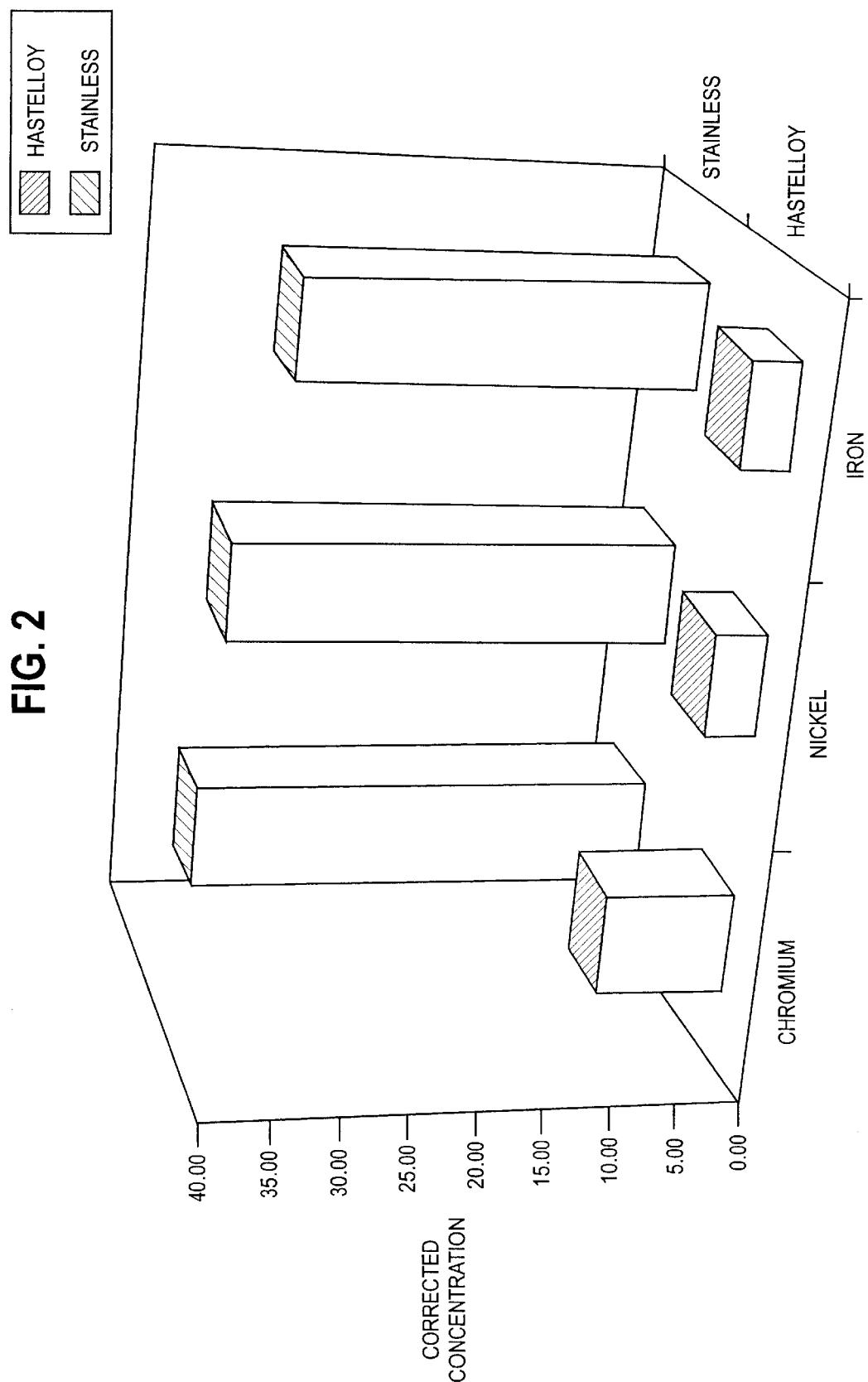
FIG. 2 is a bar graph of average liquor concentrations of chromium, nickel and iron resulting from the experiments performed in conjunction with FIG. 1.

FIG. 1 are comparative bar graphs for average corrosion weight loss for the Hastelloy C-22 samples and the stainless 316 L samples, taken in 33, 63 and 110 days. FIG. 2 is a graph of average concentrations of elements inside the liquor samples, for the nickel-based and stainless steel samples, with concentrations of chromium, nickel and iron being compared. The concentrations have been corrected according to their original concentration in the sample to provide a comparison of relative corrosion of these metals. On the average, the stainless steel tubes lost 3.8 times as much chromium, 9.5 times as much nickel, 8.6 times as much iron and 30.7 times as much silicon as the nickel-based samples.

Based on the above comparative corrosion experiments, it is expected that filter elements made according to the invention can be used in a high chloride environment (as high as 10,000 ppm) and in acidity as low as 3.1 pH for extended periods of time without the corrosion degradation that 300 series stainless steel filter elements would experience. It is expected that the useful life of nickel-based alloy filter elements according to the invention will be at least 6 times greater than corresponding stainless steel filter elements.

Filter elements according to the invention are therefore particularly suited to high chloride, acid environments such as acid converted corn syrup applications. More generally, the elements have application to any filtration of particles greater than approximately 0.11 microns that would require a halogen (other than HF) environment with a pH of below 5 and above 2, and high levels of halogens in the filter stream. The filter elements could also be used in less aggressive filtration streams needing 0.1 micron filtration capability.

While preferred embodiments of the invention have been described in the above detailed description and illustrated in the appended drawings the invention is not limited thereto but only by the scope and spirit of the appended claims.

I claim:

1. A filter comprising:
a porous metal substrate, the metal substrate consisting of a nickel-based alloy having at least 56% nickel, at least 16% chromium and at least 5% molybdenum by weight; and
a sintered metal oxide powder membrane predominately constituted by $Ti_4O_7$ and supported by the substrate.

2. The filter of claim 1, wherein the nickel-based alloy has at least 20% chromium and at least 16% molybdenum by weight.

3. The filter of claim 1, wherein the nickel-based alloy further includes at least 3% by weight of tungsten.

4. The filter of claim 1, wherein the metal substrate comprises partially fused metallic particles having a diameter no larger than about 44 microns.

5. The filter of claim 1, wherein the substrate is tubular, the sintered metal oxide power membrane being formed on an interior face of the tubular substrate.

6. The filter of claim 1, wherein the sintered metal oxide powder membrane has apertures passing particles of no more than about 0.1 microns.

* * * * *